US010509746B2

(12) United States Patent
Tashima

(10) Patent No.: US 10,509,746 B2
(45) Date of Patent: Dec. 17, 2019

(54) INFORMATION PROCESSING APPARATUS, STORAGE MEDIUM AND INFORMATION PROCESSING METHOD

(71) Applicant: FUJITSU LIMITED, Kawasaki-shi, Kanagawa (JP)

(72) Inventor: Keisuke Tashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/966,277

(22) Filed: Apr. 30, 2018

(65) Prior Publication Data
US 2018/0329840 A1 Nov. 15, 2018

(30) Foreign Application Priority Data

May 12, 2017 (JP) ................ 2017-095266

(51) Int. Cl.
*G06F 13/16* (2006.01)
*G06F 13/24* (2006.01)
*G06F 13/40* (2006.01)
*G06F 13/22* (2006.01)

(52) U.S. Cl.
CPC .............. *G06F 13/24* (2013.01); *G06F 13/22* (2013.01); *G06F 13/4068* (2013.01)

(58) Field of Classification Search
CPC ....................................................... G06F 13/16
See application file for complete search history.

(56) References Cited

U.S. PATENT DOCUMENTS 7,584,501 B2 * 9/2009 Stancil .................. G06F 1/266
709/228

FOREIGN PATENT DOCUMENTS

| JP | 5-181575 | 7/1993 |
| JP | 5-233109 | 9/1993 |
| JP | 2012-14625 | 1/2012 |

* cited by examiner

*Primary Examiner* — Cheng Yuan Tseng
(74) *Attorney, Agent, or Firm* — Staas & Halsey LLP

(57) ABSTRACT

An information processing apparatus includes a processor; and a management controller coupled to the processor and configured to prohibit interruption from a slot to the processor when an input/output (IO) device is mounted in the slot by exchange or expansion; performs setting of the IO device while the interruption from the slot to the processor is prohibited; and permit the interruption from the slot to the processor when the setting of the IO device is completed.

13 Claims, 16 Drawing Sheets

INFORMATION PROCESSING APPARATUS, STORAGE MEDIUM AND INFORMATION PROCESSING METHOD

CROSS-REFERENCE TO RELATED APPLICATION

This application is based upon and claims the benefit of priority of the prior Japanese Patent Application No. 2017-95266, filed on May 12, 2017, the entire contents of which are incorporated herein by reference.

FIELD

The embodiments discussed herein are related to an information processing apparatus, a storage medium and an information processing method.

BACKGROUND

An input/output (IO) card is mounted in an information processing apparatus such as a personal computer or a server with the aim of function extension or the like. The IO card is, for example, a network interface card (NIC), a host bus adapter (HBA), a host channel adapter (HCA), a converged network adapter (CNA), and the like.

For example, a power of the IO card to be used for maintenance or the like is turned off first, the maintenance or the like is performed, and then the power of the IO card is turned on again. Regarding restoring of setting of the IO card in such a case, some document discloses a technique as follows. Specifically, a peripheral component interconnect (PCI) bus slave stores setting contents of a configuration register in a non-volatile memory after a PCI bus master finishes a configuration. Also, in a case in which a power of the PCI bus slave is turned on and is turned off again, the PCI bus slave reads the setting contents of the configuration register from the non-volatile memory and resets the setting contents to the configuration register.

However, in a case in which the IO card is exchanged, errors may occur at the time of initiating a new IO card because a version of a firmware and a setting value (hereinafter, refer to as IO card data) in the new IO card which is mounted by exchange is different from those of IO card data before the exchange. In addition, even in a case in which the IO card is expanded in the information processing apparatus, errors may occur at the time of initiating the new IO card because the IO card data in the new IO card does not match other software in the information processing apparatus. In the related art described above, countermeasures with respect to such problems are not taken.

Japanese Laid-open Patent Publication No. 2012-14625 is example of the related art.

SUMMARY

According to an aspect of the invention, an information processing apparatus includes a processor; and circuitry coupled to the processor and configured to prohibit interruption from a slot to the processor when an input/output (IO) device is mounted in the slot by exchange or expansion; performs setting of the IO device while the interruption from the slot to the processor is prohibited; and permit the interruption from the slot to the processor when the setting of the IO device is completed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An object of an embodiment is to provide a technique for suppressing occurrence of errors in a case in which an IO card is newly mounted in an information processing apparatus in one aspect.

In one aspect, it is possible to suppress the occurrence of errors in a case in which the IO card is newly mounted in the information processing apparatus.

Embodiment 1

Figure 1:
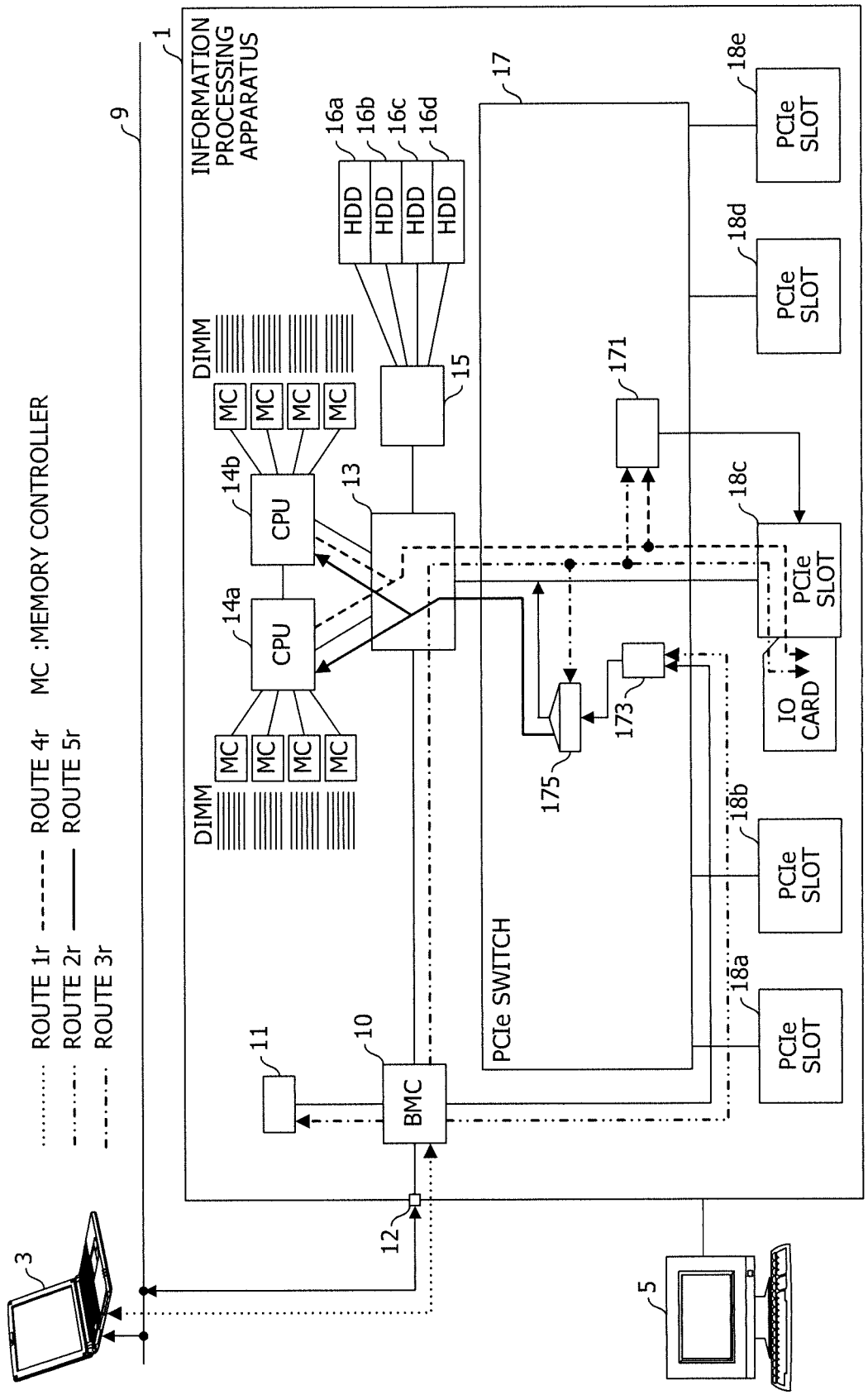
FIG. 1 is a diagram illustrating a system configuration of an embodiment.

FIG. 1 is a diagram illustrating a system configuration of this embodiment. For example, an information processing apparatus 1 which is a server apparatus includes a baseboard management controller (BMC) 10 which is a controller for management, a nonvolatile memory 11, a managing port 12, a platform controller hub (PCH) 13, central processing units (CPU) 14a and 14b, a memory controller connected to the CPUs 14a and 14b, a dual inline memory module (DIMM) being controlled by the memory controller, redundant arrays of inexpensive disks (RAID) controller 15, hard disk drives (HDD) 16a to 16d, a PCI express (hereinafter, abbreviated as PCIe) switch 17, and PCIe slots 18a to 18e. The PCIe switch 17 includes a power supply control register 171, a mechanical retention latch (MRL) 173, and an interruption control circuit 175. In an example of FIG. 1, an IO card is mounted in the PCIe slot 18c. However, two or more of the IO cards may be mounted in the information processing apparatus 1.

The information processing apparatus 1 is connected to the terminal of the administrator 3 through the managing port 12. The terminal of the administrator 3 is connected to a management local area network (LAN) 9, and accesses to the BMC 10 through a route 1r. The BMC 10 accesses to an MRL 173 through a route 2r, and accesses to the nonvolatile memory 11, the interruption control circuit 175, the power supply control register 171, and the IO card through a route 3r. The CPUs 14a and 14b access to the IO card and the power supply control register 171 through a route 4r. Interruption from the interruption control circuit 175 reaches the CPUs 14a and 14b through a route 5r.

The administrator can input instructions with respect to the CPUs 14a and 14b of the information processing apparatus 1 by operating a console 5.

Also, description of hardware components among hardware components illustrated in FIG. 1 which are not related to a main part of this embodiment will be omitted herein.

Figure 2:
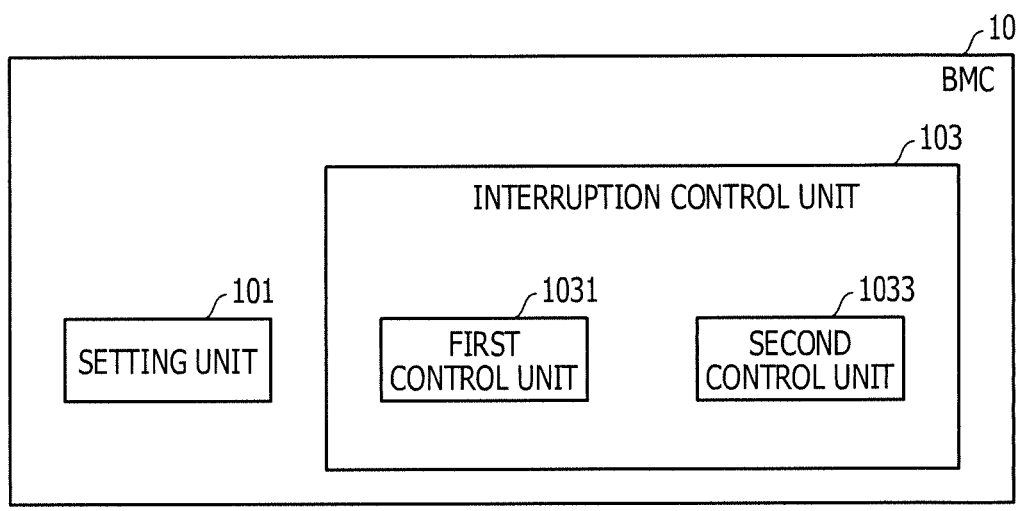
FIG. 2 is a functional block diagram of a BMC.

The BMC 10 includes a processor, and various functions are realized by executing a program loaded to a memory embedded in or connected to the BMC 10 using the processor. FIG. 2 is a functional block diagram of the BMC 10. The BMC 10 includes a setting unit 101 and an interruption control unit 103. The interruption control unit 103 includes a first control unit 1031 and a second control unit 1033.

The setting unit 101 performs setting of the IO card which is newly mounted by exchange. Here, the setting means writing of a firmware to the IO card and writing of a setting value to the IO card. The first control unit 1031 performs a process of prohibiting of the interruption to the CPUs 14a and 14b. The second control unit 1033 performs a process of permitting of the interruption to the CPUs 14a and 14b.

Also, the firmware in the embodiment includes, for example, the firmware itself, and an extension basic input/output system (BIOS), an extensible firmware interface (EFI) driver, an open boot, and the like. The setting value includes, for example, setting values relating to "MultiChannel Mode", "Personality", "SAN Boot Enable", "PLOGI Retry Timer", "Auto Scan Setting", "Adapter Parameters", an internet protocol (IP) version, an IP address, a virtual LAN (VLAN), and the like.

Next, with reference to FIGS. 3 to 10, processes being executed in an information processing apparatus 1 of a first embodiment will be described.

Figure 3:
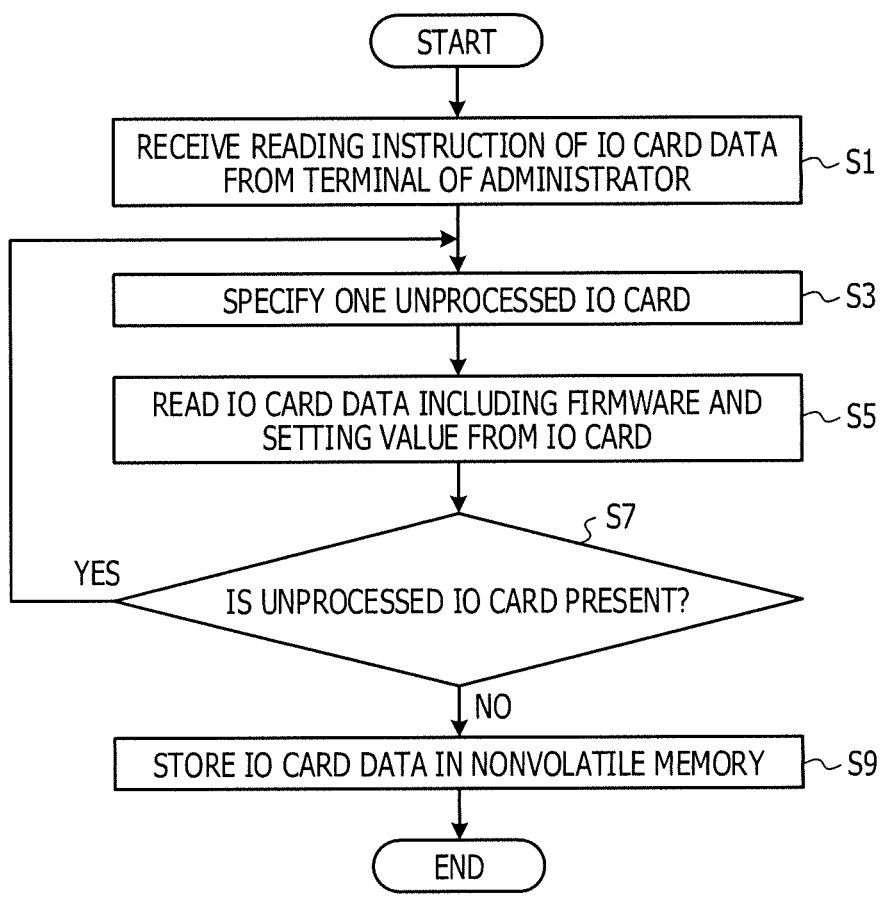
FIG. 3 is a diagram illustrating a process flow of processes which are executed by the BMC in a case of receiving a reading instruction of IO card data from a terminal of an administrator.

FIG. 3 is a diagram illustrating a process flow of processes which are executed by the BMC 10 in a case of receiving a reading instruction of IO card data from the terminal of the administrator 3.

The setting unit 101 of the BMC 10 receives the reading instruction of the IO card data from the terminal of the administrator 3 through the managing port 12 (step S1 in FIG. 3).

The setting unit 101 specifies one IO card which is not processed among the IO cards mounted in the information processing apparatus 1 (step S3).

The setting unit 101 reads the IO card data including the firmware and the setting value from a storage region of the IO card specified in step S3 (for example, register, read only memory (ROM), and the like) (step S5).

The setting unit 101 determines whether or not an unprocessed IO card is present among the IO cards mounted in the information processing apparatus 1 (step S7).

In a case in which the unprocessed IO card is present (Yes route in step S7), the process returns to step S3. Meanwhile, in a case in which there is the unprocessed IO card is not present (No route in step S7), the setting unit 101 stores the IO card data read in step S5 in the nonvolatile memory 11 (step S9). Then, the process is finished.

When such a process described above is executed, it is possible to store the IO card data in advance in the nonvolatile memory 11 in preparation for exchanging of the IO card.

Figure 4:
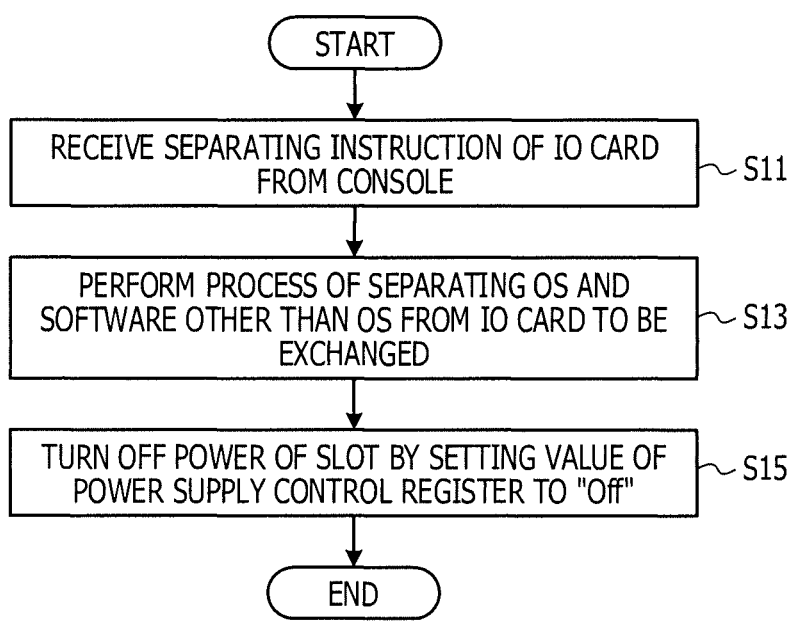
FIG. 4 is a diagram illustrating a process flow of processes which are executed by a CPU in a case of receiving a separating instruction of the IO card from a console.

FIG. 4 is a diagram illustrating a process flow of processes which are executed by a CPU (in this case, CPU 14a) in a case of receiving a separating instruction of the IO card from the administrator. This process is executed, for example, in a case in which the IO card is exchanged due to occurrence of a fault.

The CPU 14a receives the separating instruction of the IO card from the console 5 (step S11 in FIG. 4). The separating instruction of the IO card includes identification information relating to the IO card to be separated.

The CPU 14a executes a process of separating of an OS being executed by the CPUs 14a and 14b and a software (for example, application) being executed by the OS from the IO card to be exchanged (step S13). When the OS and the software being executed by the OS are separated from the IO card to be exchanged, it is possible to safely remove the OS and the software.

The CPU 14a turns off power of the PCIe slot in which the IO card to be exchanged is mounted by setting a value of the power supply control register 171 corresponding to the PCIe slot of the IO card to "Off" (step S15). Then, the process is finished.

Figure 5:
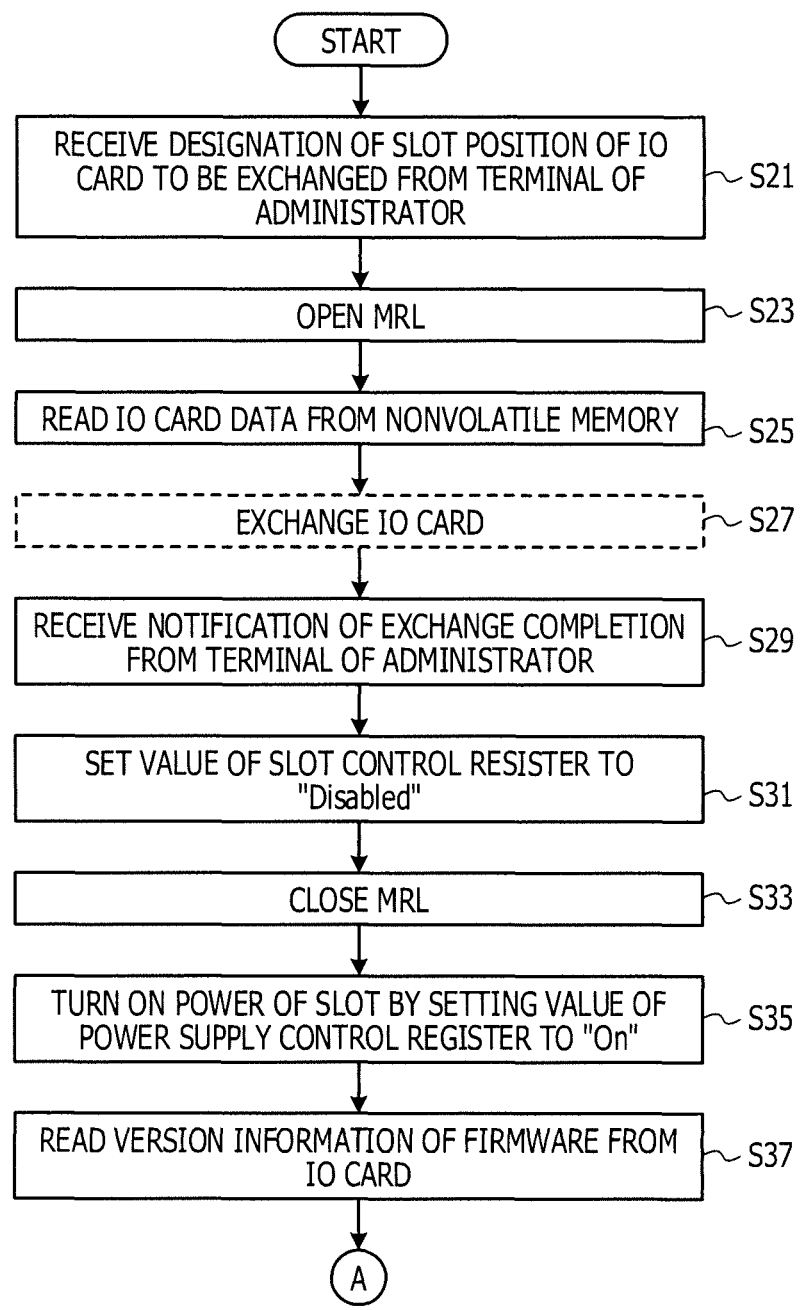
FIG. 5 is a diagram illustrating a process flow of processes which are executed by the BMC in a case in which the IO card is exchanged.

FIG. 5 is a diagram illustrating a process flow of processes which are executed by the BMC 10 in a case in which the IO card is exchanged.

The setting unit 101 receives designation of a position of the PCIe slot of the ID card to be exchanged from the terminal of the administrator 3 (step S21 in FIG. 5).

The setting unit 101 opens the MRL 173 (step S23). The MRL 173 is provided for generating an event, and is a latch which is capable of storing information relating to a state of one bit.

Figure 6:
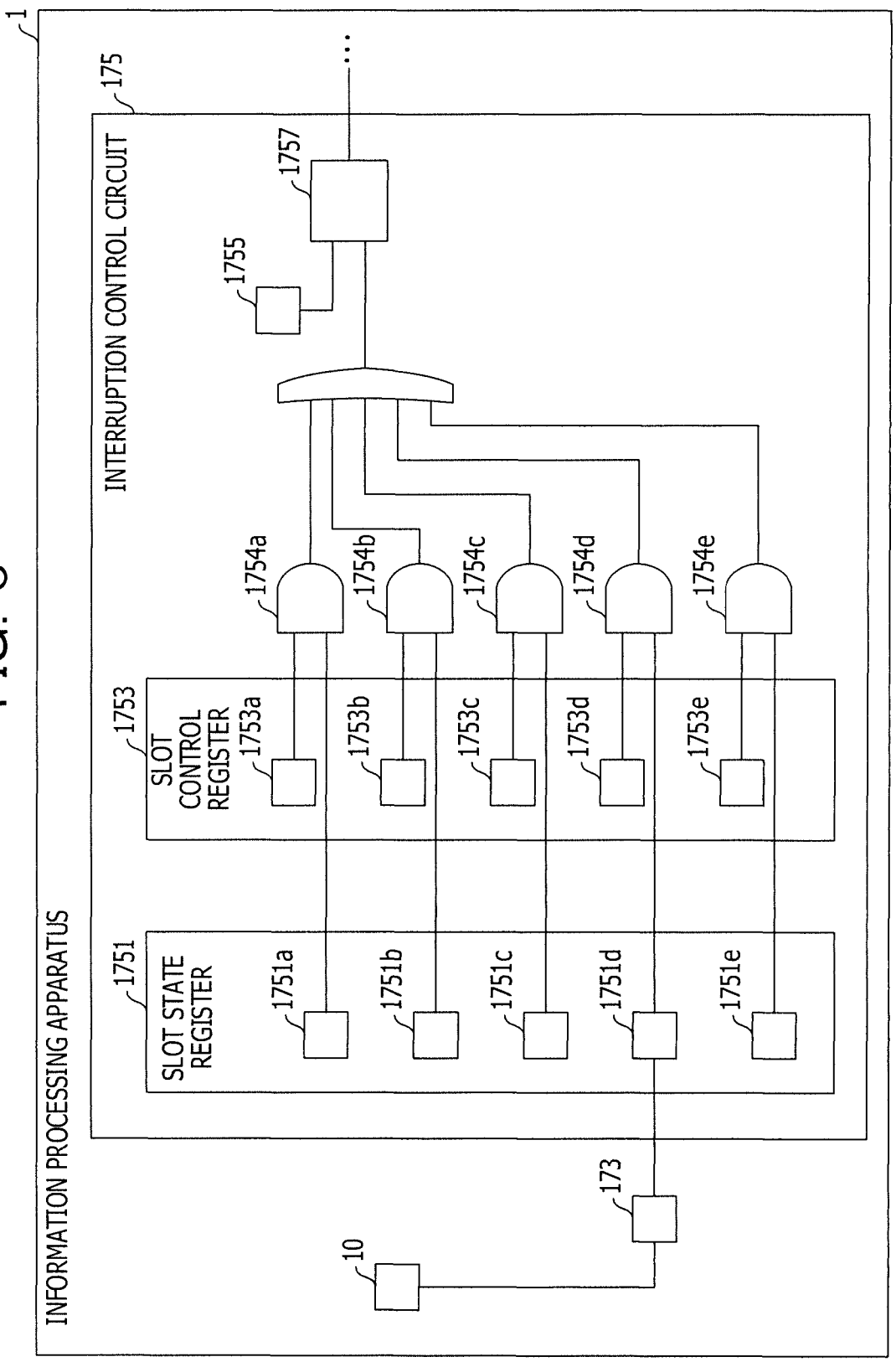
FIG. 6 is a diagram for describing occurrence of interruption.

FIG. 6 is a diagram for describing occurrence of interruption. In this embodiment, in a case in which a state of the MRL 173 corresponding to a position of the PCIe slot of the IO card to be exchanged is switched from "open" to "close" and in a case in which the state of the MRL is switched from "close" to "open", a value of a register 1751d in a slot state register 1751 is rewritten in accordance with the switching of the state. In a case in which a value of the register 1751d is changed and a value of a register 1753d of a slot control register 1753 is set to a value indicating "Enabled", data is output from an AND circuit 1754d. Also, in a case in which a value of a register 1755 is a value indicating "Enabled", interruption (interruption packet in a case of PCIe) occurs in a circuit 1757 in accordance with outputting the data from the AND circuit 1754d, and is output to the CPUs 14a and 14b.

Also, disclosing of the MRL 173 corresponding to the registers 1751a to 1751c, and 1751e in the slot state register 1751 is omitted for the sake of simple description; however, the MRL 173 may be also provided in the registers 1751a to 1751c, and 1751e.

The process returns to the description of FIG. 5, the setting unit 101 reads the IO card data of the IO card to be exchanged in the IO card data stored in the nonvolatile memory 11 (step S25).

Here, the IO card is exchanged (step S27). Since step S27 is not a process of the information processing apparatus 1, a block of step S27 is illustrated by a broken line.

The setting unit 101 receives notification of exchange completion from the terminal of the administrator 3 (step S29).

The first control unit 1031 sets a value of the register corresponding to the PCIe slot in which the IO card is exchanged among the registers of the slot control register 1753 in the interruption control circuit 175 to a value indicating "Disabled" (step S31).

The setting unit 101 closes the MRL 173 (step S33).

The setting unit 101 turns on the power of the PCIe slot in which the IO card is exchanged by setting the value of the power supply control register 171 corresponding to the PCIe slot in which the IO card is exchanged to "On" (step S35).

The setting unit 101 reads version information of the firmware from an IO card newly mounted by exchange (step S37). The version information of the firmware is included in, for example, a code of the firmware. Also, the process moves to step S39 of FIG. 7 through a terminal A.

Figure 7:
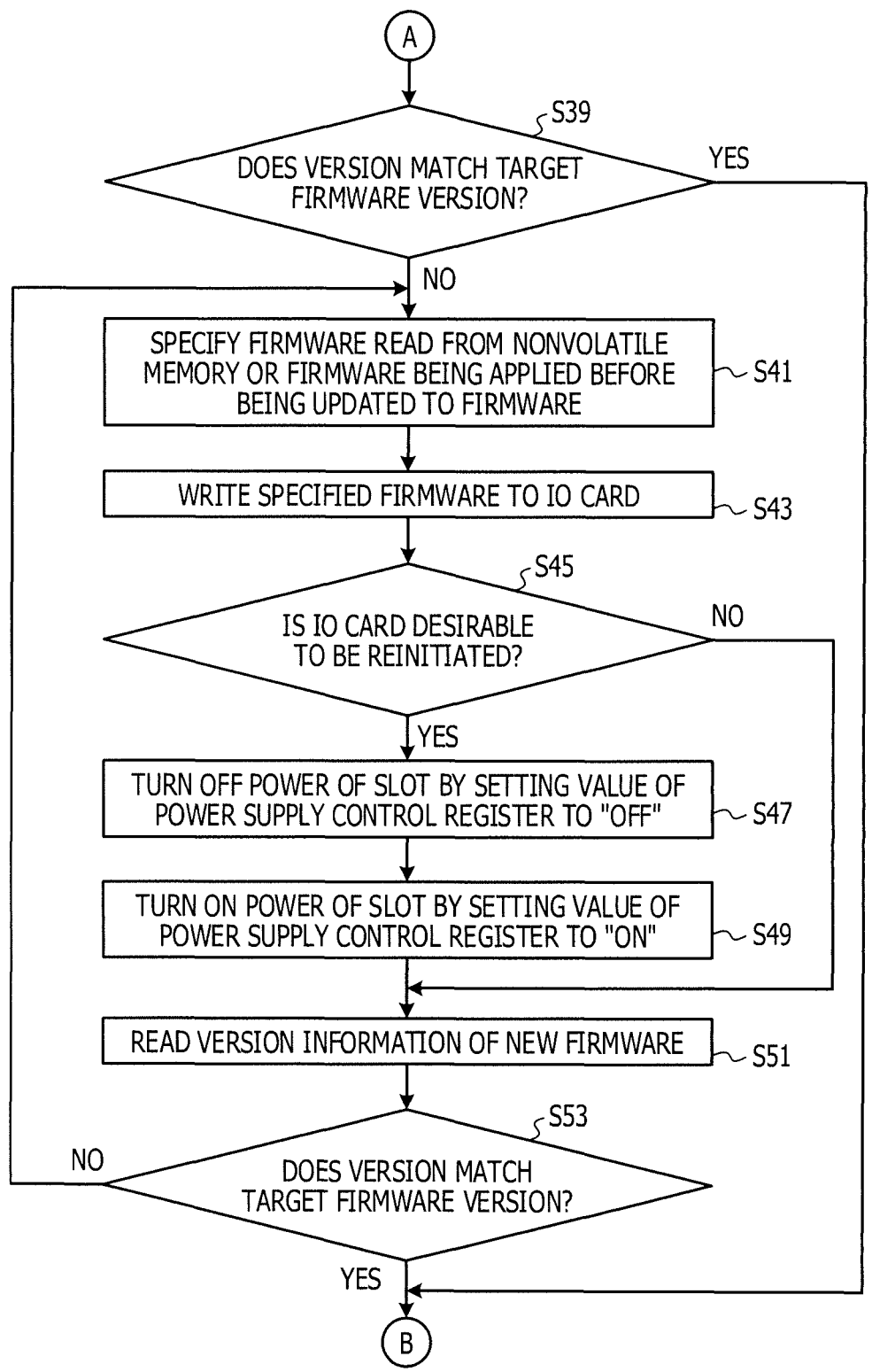
FIG. 7 is a diagram illustrating a process flow of processes which are executed by the BMC in a case in which the IO card is exchanged.

The process moves to description of FIG. 7, the setting unit 101 determines whether or not a version indicating the version information read in step S37 matches a target firmware version (that is, a version specified from the code of the firmware included in the IO card data read from the nonvolatile memory 11) (step S39).

In the version indicating the version information read in step S37, the firmware of the IO card newly mounted by exchange is not desirable to be rewritten in a case of matching the target firmware version (Yes route in step S39). Accordingly, the process moves to step S55 of FIG. 8 through a terminal B.

Meanwhile, the setting unit 101 executes processes as follows in a case in which the version indicated by the version information read in step S37 does not match the target firmware version (No route in step S39). Specifically, the setting unit 101 specifies a firmware included in the IO card data read from the nonvolatile memory 11 in step S25 or a firmware being applied before being updated to the firmware (step S41). For example, even in a case in which updating is performed from a version 1.0 to a version 2.0, there is a case in which the updating is not directly performed from the version 1.0 to the version 2.0, first, the updating is performed from the version 1.0 to the version 1.1, and then the updating is performed from the version 1.1 to the version 2.0. Accordingly, in a case in which the firmware being applied before being updated to the target firmware version is present, the firmware is read from the nonvolatile memory 11 or the like in step S41.

The setting unit 101 writes the firmware specified in step S41 to the IO card newly mounted by exchange (step S43).

The setting unit 101 determines whether or not the IO card is desirable to be reinitiated (step S45). Whether or not the IO card is desirable to be reinitiated is decided by, for example, the types of the firmware or the like.

In a case in which the IO card is not desirable to be reinitiated (No route in step S45), the process moves to step S51.

In a case in which the IO card is desirable to be reinitiated (Yes route in step S45), the setting unit 101 executes processes as follows. Specifically, the setting unit 101 turns off the power of the PCIe slot in which the IO card is exchanged by setting the value of the power supply control register 171 corresponding to the PCIe slot in which the IO card is exchanged to "Off" (step S47). After the power is turned off, the setting unit 101 turns off the power of the PCIe slot in which the IO card is exchanged by setting the value of the power supply control register 171 corresponding to the PCIe slot in which the power is turned off to "On" (step S49).

The setting unit 101 reads the version information of the firmware from the IO card newly mounted by exchange (step S51).

The setting unit 101 determines whether or not a version indicated by the version information read in step S51 matches a target firmware version (step S53).

In a case in which the version indicated by the version information read in step S51 does not match the target firmware version (No route in step S53), the process returns to step S41.

Figure 8:
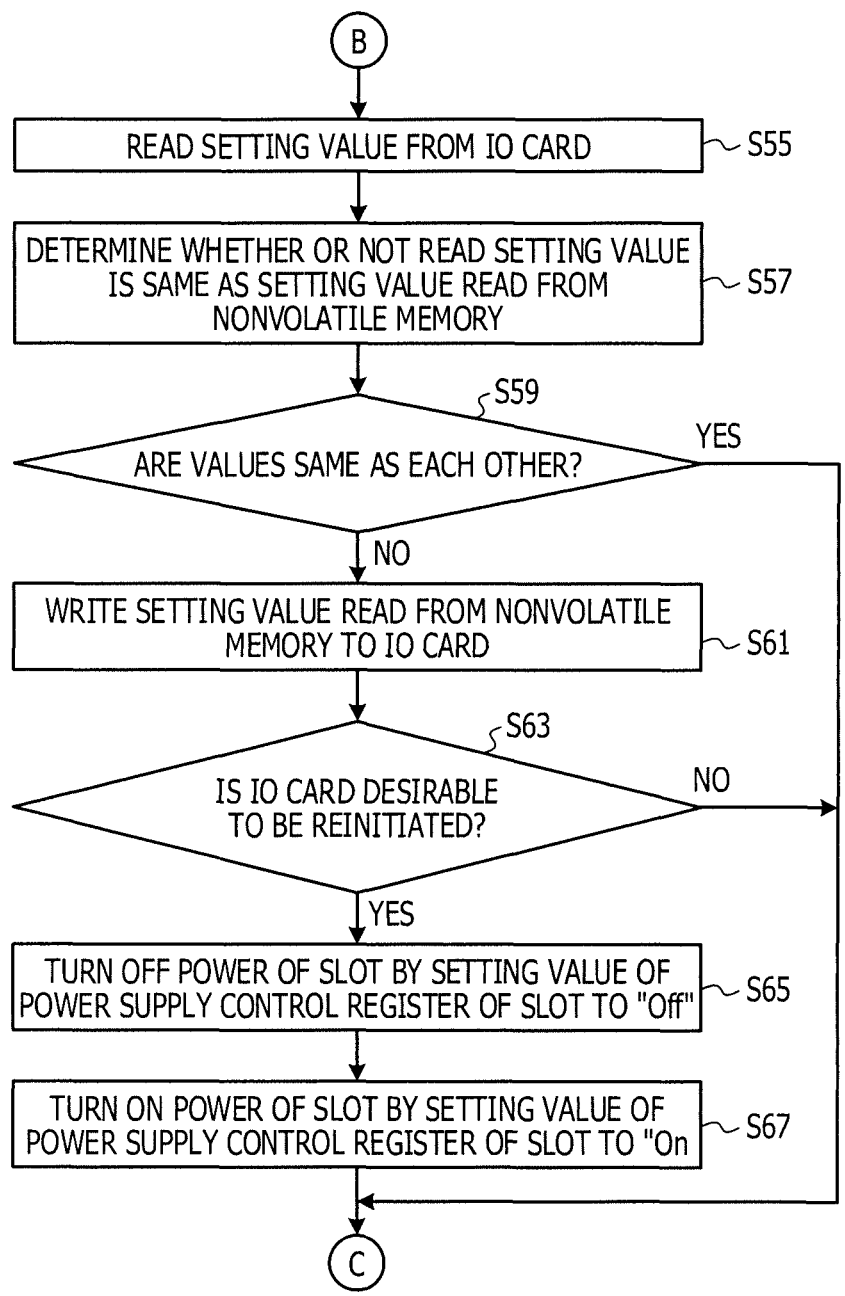
FIG. 8 is a diagram illustrating a process flow of processes which are executed by the BMC in a case in which the IO card is exchanged.

Meanwhile, in a case in which the version indicated by the version information read in step S51 matches the target firmware version (Yes route in step S53), the process moves to step S55 of FIG. 8 through the terminal B.

The process moves to description of FIG. 8, and the setting unit 101 reads the setting value from the IO card newly mounted by exchange (step S55 in FIG. 8).

The setting unit 101 determines whether or not a setting value read in step S55 is the same as a setting value read from the nonvolatile memory 11 in step S25 (step S57).

In a case in which the setting value read in step S55 is the same as the setting value read from the nonvolatile memory 11 in step S25 (Yes route in step S59), the setting value read from the nonvolatile memory 11 in step S25 is not desirable to be written to the IO card. Accordingly, the process moves to step S69 in FIG. 9 through a terminal C.

Meanwhile, in a case in which the setting value read in step S55 is not the same as the setting value read from the nonvolatile memory 11 in step S25 (No route in step S59), the setting unit 101 executes processes as follows. Specifically, the setting unit 101 writes the setting value included in the IO card data read in step S25 to the IO card newly mounted by exchange (step S61).

The setting unit 101 determines whether or not the IO card is desirable to be reinitiated (step S63).

Figure 9:
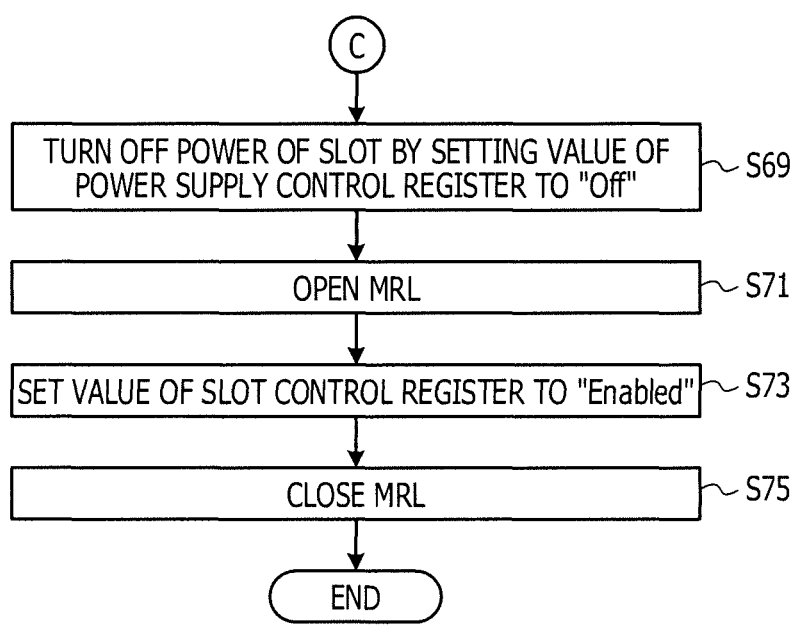
FIG. 9 is a diagram illustrating a process flow of processes which are executed by the BMC in a case in which the IO card is exchanged.

In a case in which the IO card is not desirable to be reinitiated (No route in step S63), the process moves to step S69 of FIG. 9 through the terminal C.

In a case in which the IO card is desirable to be reinitiated (Yes route in step S63), the setting unit 101 executes processes as follows. Specifically, the setting unit 101 turns off the power of the PCIe slot in which the IO card is exchanged by setting the value of the power supply control register 171 corresponding to the PCIe slot in which the IO card is exchanged to "Off" (step S65). After the power thereof is turned off, the setting unit 101 turns off the power of the PCIe slot in which the IO card is exchanged by setting the value of the power supply control register 171 corresponding to the PCIe slot in which the power is turned off to "On" (step S67). The process moves to step S69 of FIG. 9 through the terminal C.

The process moves to description of FIG. 9, the setting unit 101 turns off the power of the PCIe slot in which the IO card is exchanged by setting the value of the power supply control register 171 corresponding to the PCIe slot in which the IO card is exchanged to "Off" (step S69 in FIG. 9).

The setting unit 101 opens the MRL 173 (step S71).

The second control unit 1033 sets the value of the register corresponding to the PCIe slot in which the IO card is exchanged among the resisters of the slot control register 1753 in the interruption control circuit 175 to a value indicating "Enabled" (step S73).

The setting unit 101 closes the MRL 173 (step S75). Interruption is output from the interruption control circuit 175 by the process of step S75. Then, the process is finished.

Figure 10:
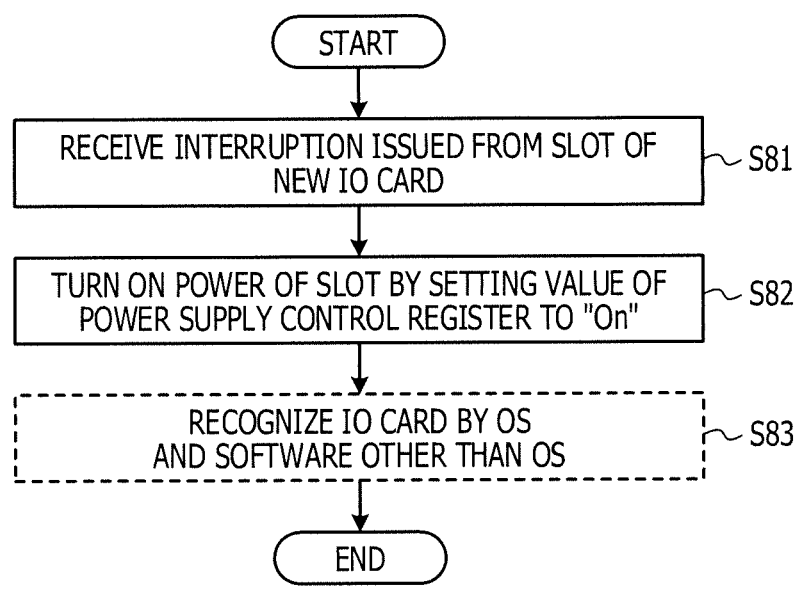
FIG. 10 is a diagram illustrating a process flow of processes which are executed by the CPU receiving interruption.

FIG. 10 is a diagram illustrating a process flow of processes which are executed by a CPU (here, refer to as CPU 14a) receiving interruption.

The CPU 14a receives the interruption issued from the PCIe slot in which the IO card is exchanged (step S81 in FIG. 10).

The CPU 14a turns on the power of the PCIe slot in which the IO card is exchanged by setting the value of the power supply control register 171 corresponding to the PCIe slot in which the IO card is exchanged to "On" (step S83).

Also, the OS being executed by the CPUs 14a and 14b and the software being executed by the OS recognize an IO card which is newly added by exchange (step S85). Then, the process is finished.

As described above, in a case in which the IO card is exchanged, the interruption from the PCIe slot in which the IO card is newly mounted is prohibited, and the firmware and the setting value are written. Accordingly, since the IO card is not recognized by the OS until the writing is completed (that is, logically isolated), it is possible to suppress occurrence of errors at the time of initiating.

In addition, in a case in which the administrator leads the writing of the firmware and the setting value, a fault is possible to occur; however, according to this embodiment, the writing is quickly performed without the fault.

In addition, according to the embodiment, since the processes are performed without turning off the power of the information processing apparatus 1, an application or the like executed by the CPUs 14a and 14b is not desirable to be stopped. Accordingly, a service provider who is the administrator of the information processing apparatus 1 can improve a quality of service to customers.

In addition, since the rewriting is also performed on either of the firmware and the setting value only in a case in which rewriting is desirable to be performed, useless processes are omitted, and thereby making it possible to reduce time until initiating of the IO card is completed.

Embodiment 2

The IO card is exchanged in the first embodiment, but an IO card is additionally mounted in a second embodiment (that is, the IO card is expanded).

Figure 11:
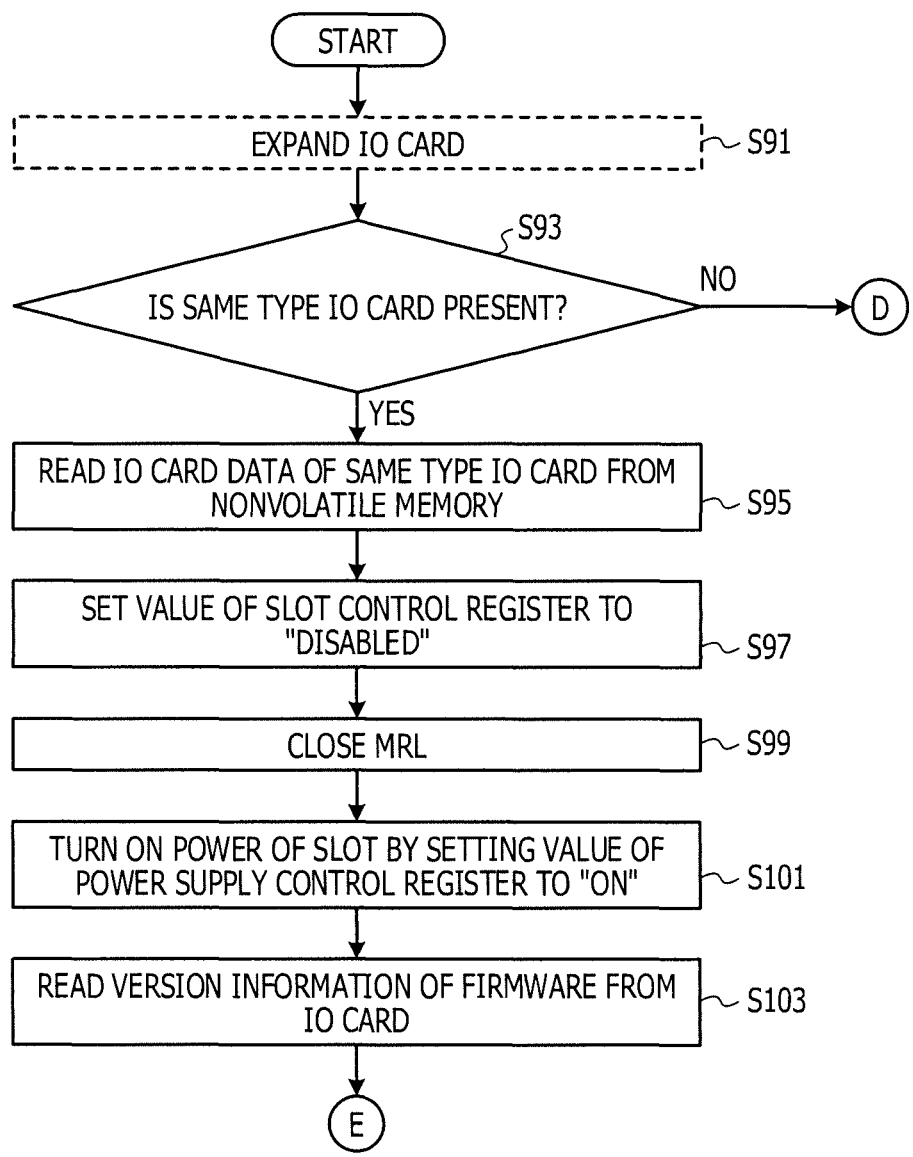
FIG. 11 is a diagram illustrating a process flow of processes which are executed by the BMC in a case in which the IO card is additionally mounted.

FIG. 11 is a diagram illustrating a process flow of processes which are executed by the BMC 10 in a case in which the IO card is expanded.

First, an IO card is newly mounted in a PCIe slot one of the PCIe slots 18a to 18e of the information processing apparatus 1 (step S91). A process of step S91 is not a process executed by the information processing apparatus 1, and thus a block of step S91 is illustrated by a broken line.

The setting unit 101 of the information processing apparatus 1 determines whether or not an IO card in which the type is the same as the type of the IO card mounted in step S91 is mounted in the information processing apparatus 1 (step S93).

In a case in which the IO card in which the type is the same as the type of the IO card mounted in step S91 is not mounted in the information processing apparatus 1 (No route in step S93), the IO card data which is writable to the IO card mounted in step S91 is not stored in the nonvolatile memory 11. Accordingly, the process moves to step S141 of FIG. 15 through a terminal D. Processes after the terminal D will be described later.

Meanwhile, in a case in which the IO card in which the type is the same as the type of the IO card mounted in step S91 is mounted in the information processing apparatus 1 (Yes route in step S93), the setting unit 101 executes processes as follows. Specifically, the setting unit 101 reads IO card data of the IO card in which the type is the same as the type of the IO card mounted in step S91 from the nonvolatile memory 11 (step S95).

The first control unit 1031 sets the value of the register corresponding to the PCIe slot in which the IO card is newly mounted among the registers of the slot control register 1753 in the interruption control circuit 175 to a value indicating "Disabled" (step S97).

The setting unit 101 closes the MRL 173 (step S99).

The setting unit 101 turns on the power of the PCIe slot in which the IO card is newly mounted by setting the value of the power supply control register 171 corresponding to the PCIe slot in which the IO card is newly mounted to "On" (step S101).

The setting unit 101 reads version information of the firmware from an IO card which is newly mounted (step S103). The version information of the firmware is included in, for example, a code of the firmware. Then, the process moves to step S105 of FIG. 12 through a terminal E.

Figure 12:
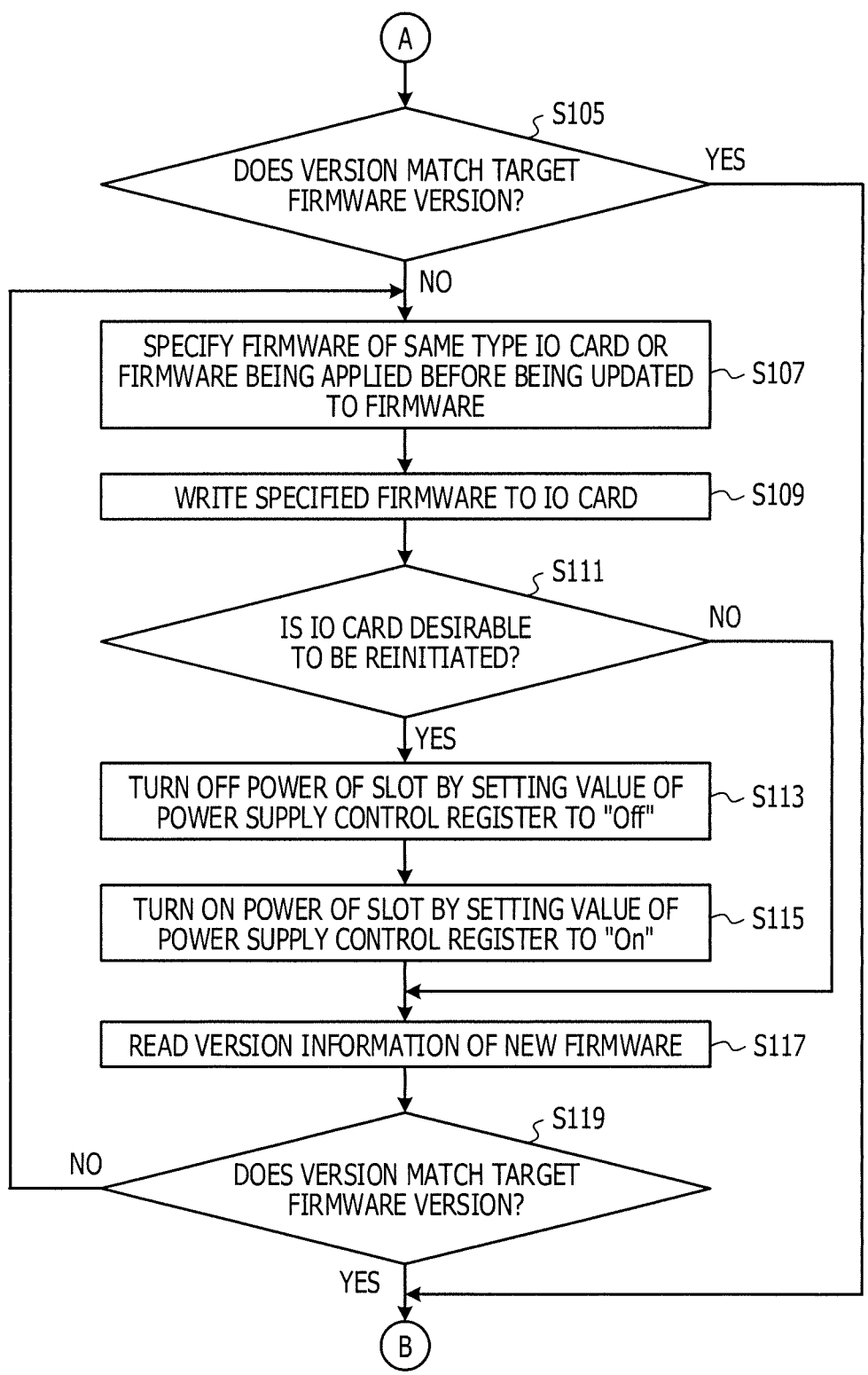
FIG. 12 is a diagram illustrating a process flow of processes which are executed by the BMC in a case in which the ID card is additionally mounted.

The process moves to description of FIG. 12, the setting unit 101 determines whether or not a version indicated by the version information read in step S103 matches a target firmware version (that is, a version specified from the code of the firmware included in the IO card data read from the nonvolatile memory 11) (step S105 in FIG. 12).

In a case in which the version indicated by the version information read in step S103 matches the target firmware version (Yes route in step S105), the firmware of the IO card newly mounted is not desirable to be rewritten. Accordingly, the process moves to step S121 of FIG. 13 through a terminal F.

Meanwhile, in a case in which the version indicated by the version information read in step S103 does not match the target firmware version (No route in step S105), the setting unit 101 executes processes as follows. Specifically, the setting unit 101 specifies the firmware included in the IO card data read from the nonvolatile memory 11 in step S95 or the firmware being applied before being updated to the firmware (step S107).

The setting unit 101 writes the firmware specified in step S107 to the IO card newly mounted (step S109).

The setting unit 101 determines whether or not the ID card is desirable to be reinitiated (step S111). Whether or not the IO card is desirable to be reinitiated is decided, for example, by the types of the firmware or the like.

In a case in which the IO card is not desirable to be reinitiated (No route in step S111), the process moves to step S117.

In a case in which the IO card is desirable to be reinitiated (Yes route in step S111), the setting unit 101 executes processes as follows. Specifically, the setting unit 101 turns off the power of the PCIe slot in which the IO card is newly mounted by setting the value of the power supply control register 171 corresponding to the PCIe slot in which the IO card is newly mounted to "Off" (step S113). After the power is turned off, the setting unit 101 turns on the power of the PCIe slot in which the IO card is newly mounted by setting the value of the power supply control register 171 corresponding to the PCIe slot in which the power is turned off to "On" (step S115).

The setting unit 101 reads the version information of the firmware from the IO card newly mounted (step S117).

The setting unit 101 determines whether or not the version indicated by the version information read in step S117 matches the target firmware version (step S119).

In a case in which the version indicated by the version information read in step S117 does not match the target firmware version (No route in step S119), the process returns to step S107.

Figure 13:
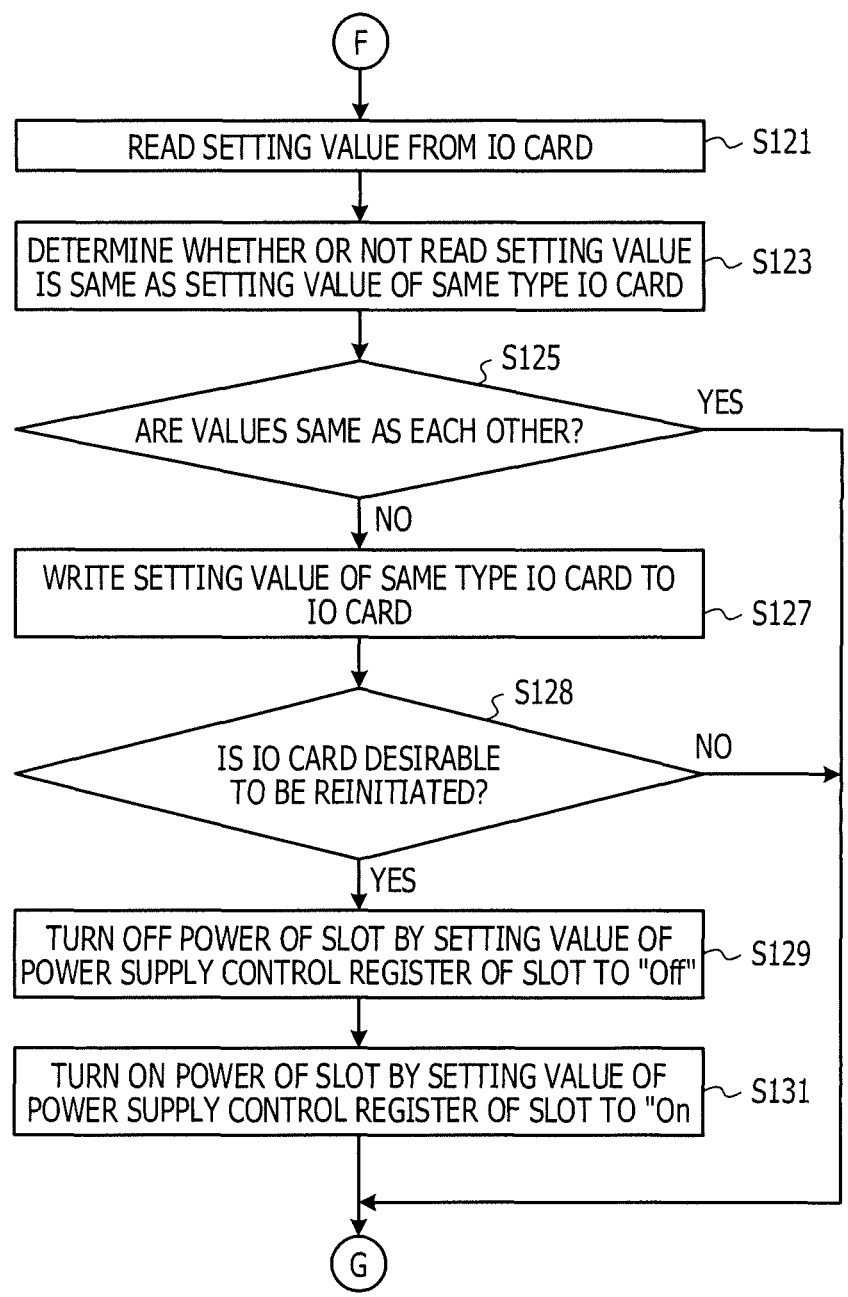
FIG. 13 is a diagram illustrating a process flow of processes which are executed by the BMC in a case in which the IO card is additionally mounted.

Meanwhile, in a case in which the version indicated by the version information read in step S117 matches the target firmware version (Yes route in step S119), the process moves to step S121 of FIG. 13 through the terminal F.

The process moves to description of FIG. 13, the setting unit 101 reads the setting value from the IO card newly mounted (step S121 in FIG. 13).

The setting unit 101 determines whether or not in the setting value read in step S121 is the same as a setting value read from the nonvolatile memory 11 in step S95 (step S123).

In a case in which the setting value read in step S121 is the same as the setting value read from the nonvolatile memory 11 in step S95 (Yes route in step S125), the setting value read from the nonvolatile memory 11 in step S95 is not desirable to be written to the IO card. Accordingly, the process moves to step S133 of FIG. 14 through a terminal G.

Meanwhile, in a case in which the setting value read in step S121 is not the same as the setting value read from the nonvolatile memory 11 in step S95 (No route in step S125), the setting unit 101 executes processes as follows. Specifically, the setting unit 101 writes the setting value included in the IO card data read in step S95 to the IO card newly mounted (step S127).

The setting unit 101 determines whether or not the IO card is desirable to be reinitiated (step S128).

Figure 14:
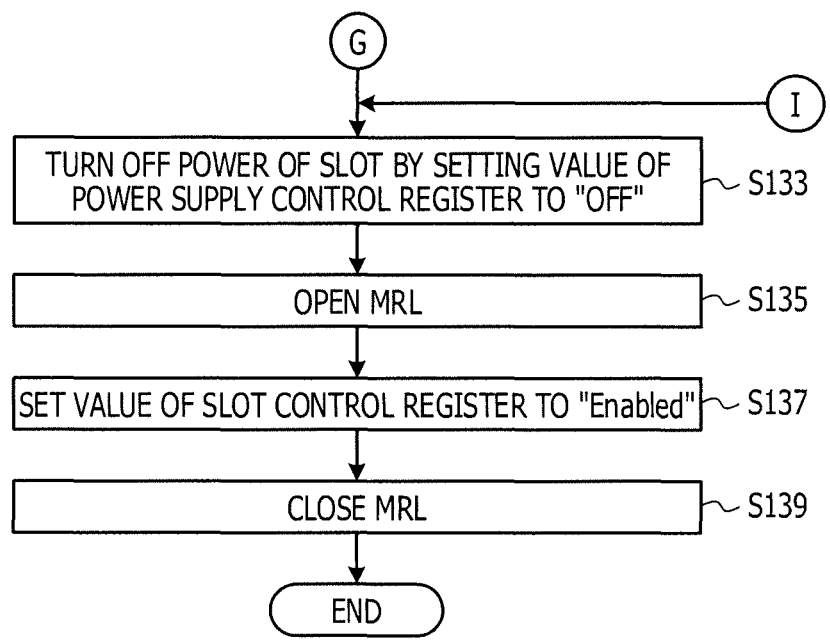
FIG. 14 is a diagram illustrating a process flow of processes which are executed by the BMC in a case in which the IO card is additionally mounted.

In a case in which the IO card is not desirable to be reinitiated (No route in step S128), the process moves to step S133 of FIG. 14 through the terminal G.

In a case in which the IO card is desirable to be reinitiated (Yes route in step S128), the setting unit 101 executes processes as follows. Specifically, the setting unit 101 turns off the power of the PCIe slot in which the IO card is newly mounted by setting the value of the power supply control register 171 corresponding to the PCIe slot in which the IO card is newly mounted to "Off" (step S129). After the power is turned off, the setting unit 101 turns on the power of the PCIe slot in which the IO card is newly mounted by setting the value of the power supply control register 171 corresponding to the PCIe slot in which the power is turned off to "On" (step S131). Then, the process moves to step S133 of FIG. 14 through the terminal G.

Moves to description of FIG. 14, the setting unit 101 turns off the power of the PCIe slot in which the IO card is newly mounted by setting the value of the power supply control register 171 corresponding to the PCIe slot in which the IO card is newly mounted to "Off" (step S133 in FIG. 14).

The setting unit 101 opens the MRL 173 (step S135).

The second control unit 1033 sets the value of the register corresponding to the PCIe slot in which the IO card is newly mounted among the registers of the slot control register 1753 in the interruption control circuit 175 to a value indicating "Enabled" (step S137).

The setting unit 101 closes the MRL 173 (step S139). Because of the process of step S139, interruption is output from the interruption control circuit 175. Then, the process is finished.

As described above, in a case in which the same type IO card is mounted in the information processing apparatus 1, the firmware and the setting value is simply written to the IO card newly mounted using the IO card data of the IO card.

Next, the processes after the terminal D will be described.

Figure 15:
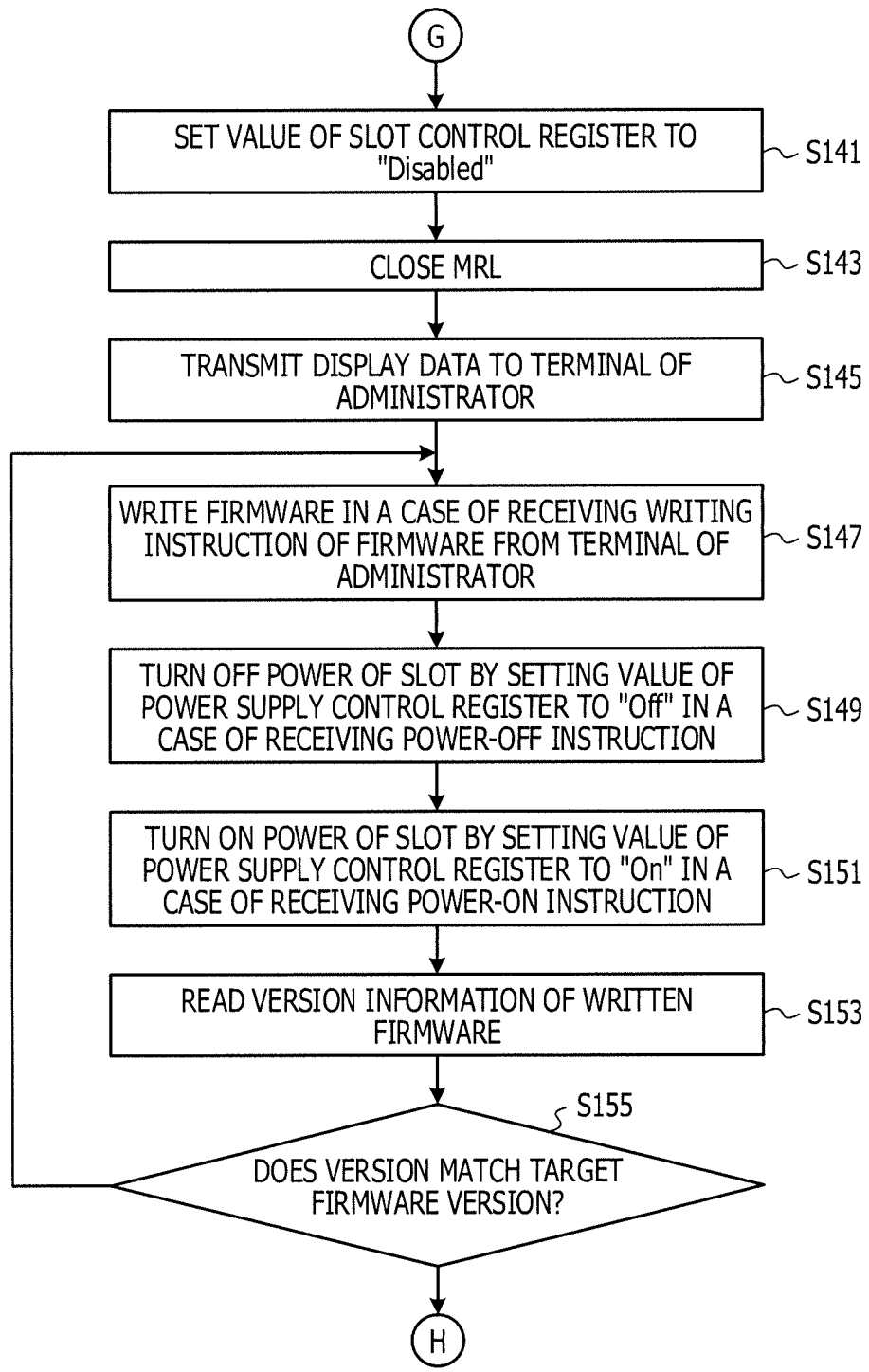
FIG. 15 is a diagram illustrating a process flow of processes which are executed by the BMC in a case in which the IO card is additionally mounted.

First, the first control unit 1031 sets the value of the register corresponding to the PCIe slot in which the IO card is newly mounted among the registers of the slot control register 1753 in the interruption control circuit 175 to a value indicating "Disabled" (step S141 in FIG. 15).

The setting unit 101 closes the MRL 173 (step S143).

The setting unit 101 transmits display data for urging designation of the firmware to the terminal of the administrator 3 (step S145). Accordingly, the administrator inputs a writing instruction including a storing location of the firmware to be written to the IO card newly mounted and identification information of the firmware using an input device of the terminal of the administrator 3.

The setting unit 101 reads the firmware from the storing location of the designated firmware in a case of receiving the writing instruction of the firmware from the terminal of the administrator 3. Also, the setting unit 101 writes the read firmware to the IO card newly mounted (step S147). Continuously, the administrator inputs an reinitiating instruction of the PCIe slot in which the IO card is newly mounted using the input device of the terminal of the administrator 3, in a case in which the IO card is desirable to be reinitiated.

The setting unit 101 turns off the power of the PCIe slot in which the IO card is newly mounted by setting the value of the power supply control register 171 corresponding to the PCIe slot in which the IO card is newly mounted to "Off", in a case of receiving the reinitiating instruction from the terminal of the administrator 3 (step S149). The setting unit 101 turns on the power of the PCIe slot in which the IO card is newly mounted by setting the value of the power supply control register 171 corresponding to the PCIe slot in which the power is turned off to "On" (step S151).

The setting unit 101 reads the version information of the firmware written in step S147 from the IO card newly mounted (step S153).

The setting unit 101 determines whether or not the version indicated by the version information read in step S153 matches the target firmware version (here, the version of the firmware to be written to the IO card newly mounted) (step S155).

In a case in which the version indicated by the version information read in step S153 does not match the target firmware version (No route in step S155), the process returns to step S147.

Figure 16:
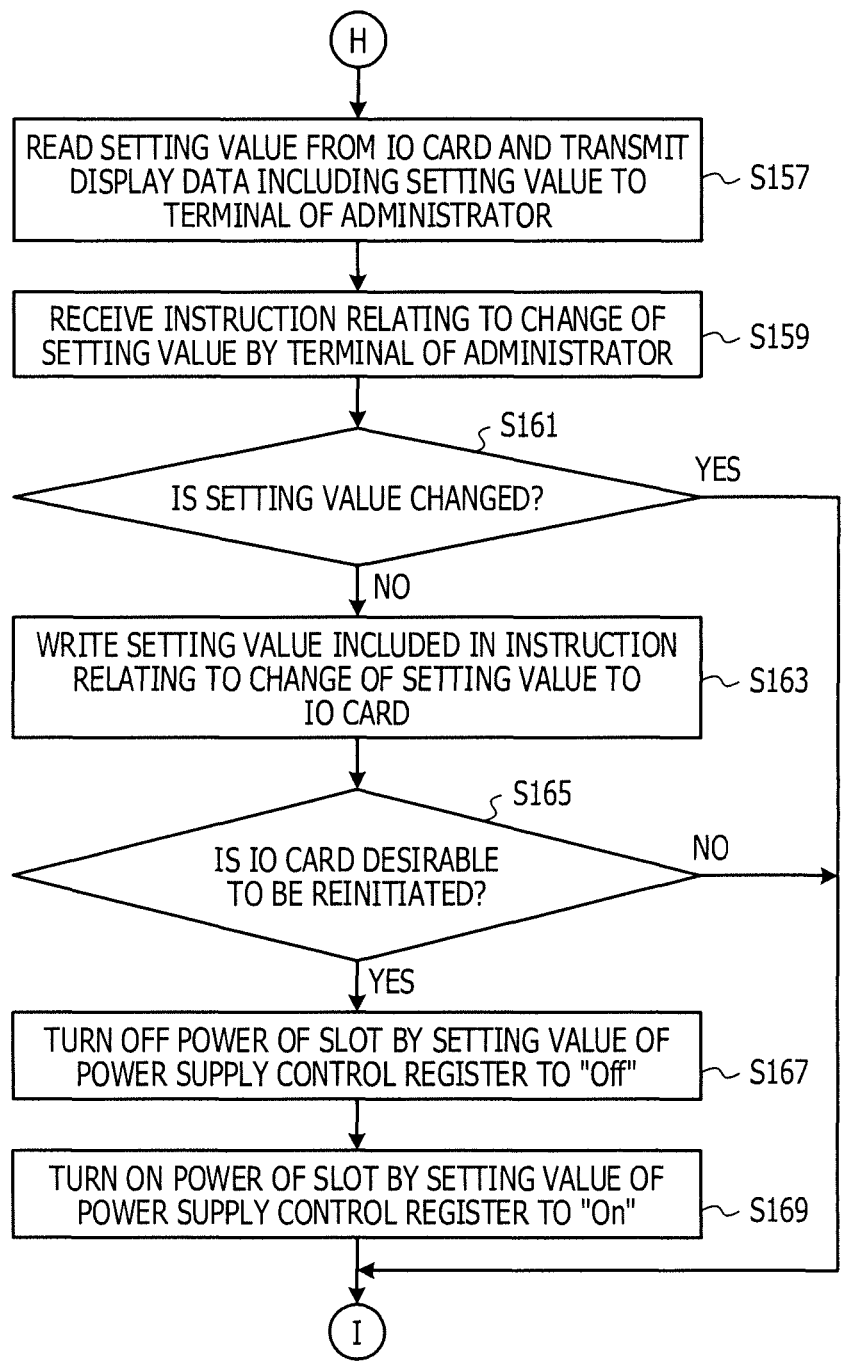
FIG. 16 is a diagram illustrating a process flow of processes which are executed by the BMC in a case in which the IO card is additionally mounted.

Meanwhile, in a case in which the version indicated by the version information read in step S153 matches the target firmware version (Yes route in step S155), the process moves to step S157 of FIG. 16 through a terminal H.

The process moves to description of FIG. 16, the setting unit 101 reads the setting value from the IO card newly mounted, and transmits the display data including the read setting value to the terminal of the administrator 3 (step S157 in FIG. 16). The administrator determines whether or not the setting value is desirable to be changed, and transmits an instruction (hereinafter, refer to as an instruction relating to the change of the setting value) including the setting value to the BMC 10 by the terminal of the administrator 3, in a case in which the setting value is changed in accordance with the determined result.

The setting unit 101 receives the instruction relating to the change of the setting value from the terminal of the administrator 3 (step S159).

The setting unit 101 determines whether or not the determined result included in the received instruction in step S159 indicates that the setting value is desirable to be changed (step S161).

In a case in which the setting value is not desirable to be changed (No route in step S161), the process moves to step S133 of FIG. 14 through a terminal I.

Meanwhile, in a case in which the setting value is desirable to be changed (Yes route in step S161), the setting unit 101 executes processes as follows. Specifically, the setting unit 101 writes the setting value included in the instruction relating to the change of the setting value to the IO card newly mounted (step S163). Continuously, in a case in which the IO card is desirable to be reinitiated, the administrator inputs the reinitiating instruction of the PCIe slot in which the IO card is newly mounted using the input device of the terminal of the administrator 3 and transmits the input instruction to the BMC 10 using the terminal of the administrator 3.

The setting unit 101 determines whether or not the IO card is desirable to be reinitiated based on whether or not the reinitiating instruction is received from the terminal of the administrator 3 (step S165).

In a case in which the IO card is not desirable to be reinitiated (No route in step S165), the process moves to step S133 of FIG. 14 through the terminal I.

In a case in which the IO card is desirable to be reinitiated (Yes route in step S165), the setting unit 101 executes processes as follows. Specifically, the setting unit 101 turns off the power of the PCIe slot in which the IO card is newly mounted by setting the value of the power supply control register 171 corresponding to the PCIe slot in which the IO card is newly mounted to "Off" (step S167). After the power is turned off, the setting unit 101 turns on the power of the PCIe slot in which the IO card is newly mounted by setting the value of the power supply control register 171 corresponding to the PCIe slot in which the power is turned off to "On" (step S169). Then, the process moves to step S133 of FIG. 14 through the terminal I.

As described above, even in a case in which the same type IO card is not mounted in the information processing apparatus 1, the firmware and the setting value are written to the IO card newly mounted based on the designation from the administrator, it is possible to suppress occurrence of errors.

Hitherto, the embodiments are described, but it is not limited thereto. For example, a functional block configuration of the BMC 10 described above may not match a real program module configuration.

In addition, even in a process flow, an order of processes can be changed if a process result is not changed. Further, the processes may be executed in parallel.

In addition, in FIG. 3, the IO card data is stored in accordance with the reading instruction from the terminal of the administrator 3, but the IO card data may be regularly stored regardless of the reading instruction.

In addition, the IO cards are processed not only one by one, but a plurality of the IO cards also may be processed.

In addition, the IO card data may be stored in the terminal of the administrator 3 instead of the nonvolatile memory 11.

When the embodiments described above are summarized, it is as follows.

The information processing apparatus according to a first aspect of the embodiment includes a processor and a management controller. The management controller includes (A) a first processing unit (the first control unit 1031 in the embodiment is an example of the first processing unit) that performs a process of prohibiting interruption from a slot to the processor in a case in which an IO device is mounted in the slot by exchange or expansion, (B) a second processing unit (the setting unit 101 in the embodiment is an example of the second processing unit) that performs setting of an IO device while the interruption from the slot to the processor is prohibited, and (C) a third processing unit (the second control unit 1033 in the embodiment is an example of the third processing unit) that performs a process of permitting the interruption from the slot to the processor in a case in which the setting of the IO device is completed.

Errors may occur when a general IO device is initiated due to contents of data (for example, a firmware, a setting value, and the like) in the IO device. However, as described above, if the interruption does not reach the processor, the processor is not capable of recognizing the IO device, and thus errors does not occur. Accordingly, as seen described above, it is possible to suppress occurrence of errors in a case in which the IO device is newly mounted in the information processing apparatus.

In addition, the second processing unit may perform (b1) the setting of the IO device based on the data acquired in advance from the IO device which is mounted in the slot before the exchange.

It is possible to also apply same setting as the setting of the IO device, which is mounted before the exchange, to the IO device.

In addition, the second processing unit may perform (b2) the setting of the IO device based on the data acquired from the IO device in which the type is the same as the type of the IO device and which is mounted in a slot different from the slot.

An appropriate setting is easily performed.

In addition, the second processing unit may perform (b3) the setting of the IO device, in a case in which whether or not the data in the IO device is the same as data to be written by the setting of the IO device is determined, and the data in the IO device is different from the data to be written by the setting of the IO device.

In addition, the first processing unit may perform (a1) prohibiting of the interruption from the slot to the processor by rewriting a value of the register for controlling occurrence of interruption from a first value to a second value.

In addition, the third processing unit may perform (c1) permitting of the interruption from a first slot to the processor by rewriting the value of the register from the second value to the first value and may (c2) cause the interruption from the slot to the processor to occur by switching a latch connected to the register.

It is possible to notify mounting of the IO device to an OS.

In addition, the setting of the IO device may include writing of the firmware and the setting value to a storage region of the IO device.

A setting method according to a second aspect of the embodiment includes (D) performing a process of prohibiting of the interruption from the slot to the processor in a case in which the IO device is mounted in the slot of the information processing apparatus by exchange and expansion, (E) performing a process of setting of the IO device while the interruption from the slot to the processor is prohibited, and (F) performing a process of permitting of the interruption from the slot to the processor in a case in which the setting of the IO device is completed.

Also, it is possible to create a program for executing the processes by the method described above, and the program is stored in, for example, a storage medium or a storage device, which is readable by a computer, such as a flexible disk, a CD-ROM, a magneto-optical disk, a semiconductor memory, and a hard disk. Moreover, an intermediate processing result is temporally stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A information processing apparatus, comprising:
   a processor; and
   circuitry coupled to the processor and configured to:
      prohibit interruption from a slot to the processor when an input/output (IO) device is mounted in the slot by exchange or expansion;
      perform setting including writing of data to the IO device during the interruption from the slot to the processor is prohibited; and
      permit the interruption from the slot to the processor when the setting to the IO device is completed,
   wherein the circuitry is configured to:
      determine whether the data in the IO device is a same as data to be written by the setting of the IO device, and
      perform the setting of the IO device when it is determined that the data in the IO device is not the same as the data to be written by the setting of the IO device.

2. A non-transitory computer-readable storage medium storing a program that causes circuitry included in an information processing apparatus to execute a process, the process comprising:
   prohibiting interruption from a slot to a processor when an input/output (IO) device is mounted in the slot by exchange or expansion;
   performing setting including writing of data to the IO device during the interruption from the slot to the processor is prohibited;
   permitting the interruption from the slot to the processor when the setting to the IO device is completed; and
   determining whether the data in the IO device is a same as data to be written by the setting of the IO device,
   wherein the performing includes performing the setting of the IO device when it is determined that the data in the IO device is not the same as the data to be written by the setting of the IO device.

3. An information processing method executed by circuitry included in an information apparatus, the information processing method comprising:
   prohibiting interruption from a slot to a processor when an input/output (IO) device is mounted in the slot by exchange or expansion;
   performing setting including writing of data to the IO device during the interruption from the slot to the processor is prohibited;
   permitting the interruption from the slot to the processor when the setting to the IO device is completed; and
   determining whether the data in the IO device is a same as data to be written by the setting of the IO device,
   wherein the performing includes performing the setting of the IO device when it is determined that the data in the IO device is not the same as the data to be written by the setting of the IO device.

4. The information processing apparatus according to claim 1, wherein the circuitry is configured to
   perform the setting of the IO device based on data acquired in advance from the IO device mounted in the slot before exchange.

5. The information processing apparatus according to claim 1, wherein the circuitry is configured to
   perform the setting of the IO device based on data acquired from an IO device in which a type is a same as the type of the IO device and which is mounted in a slot different from the slot in the IO device.

6. The information processing apparatus according to claim 1, wherein the circuitry is configured to
   prohibit the interruption from the slot to the processor by rewriting a value of a register for controlling occurrence of interruption from a first value to a second value.

7. The information processing apparatus according to claim 6, wherein the circuitry is configured to:
   permit the interruption from a first slot to the processor by rewriting the value of the register from the first value to the second value, and
   cause the interruption from the slot to the processor to occur by switching a latch connected to the register.

8. The information processing apparatus according to claim 1,
   wherein the setting of the IO device includes writing of a firmware and a setting value to a storage region of the IO device.

9. The storage medium according to claim 2, wherein the performing includes
   performing the setting of the IO device based on data acquired in advance from the IO device mounted in the slot before exchange.

10. The storage medium according to claim 2, wherein the performing includes
    performing the setting of the IO device based on data acquired from an IO device in which a type is a same as the type of the IO device and which is mounted in a slot different from the slot in the IO device.

11. The storage medium according to claim 2, wherein the prohibiting includes prohibiting the interruption from the slot to the processor by rewriting a value of a register for controlling occurrence of interruption from a first value to a second value.

12. The storage medium according to claim 11, wherein the permitting includes:
permitting the interruption from a first slot to the processor by rewriting the value of the register from the first value to the second value, and
causing the interruption from the slot to the processor to occur by switching a latch connected to the register.

13. The storage medium according to claim 2,
wherein the setting of the IO device includes writing of a firmware and a setting value to a storage region of the IO device.

* * * * *